United States Patent
Koyama et al.

(10) Patent No.: US 9,172,989 B2
(45) Date of Patent: Oct. 27, 2015

(54) INFORMATION PROCESSING APPARATUS, INFORMATION PROCESSING SYSTEM, INFORMATION PROCESSING METHOD, TELEVISION PROGRAM BROADCASTING METHOD, PROGRAM, AND INFORMATION STORAGE MEDIA

(75) Inventors: Nobutoshi Koyama, Kanagawa (JP); Hisashi Tomita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/346,105

(22) PCT Filed: Jul. 4, 2012

(86) PCT No.: PCT/JP2012/067103
§ 371 (c)(1),
(2), (4) Date: Mar. 20, 2014

(87) PCT Pub. No.: WO2013/046844
PCT Pub. Date: Apr. 4, 2013

(65) Prior Publication Data
US 2014/0229974 A1 Aug. 14, 2014

(30) Foreign Application Priority Data
Sep. 28, 2011 (JP) ................................. 2011-211902

(51) Int. Cl.
*H04N 7/167* (2011.01)
*H04N 21/433* (2011.01)
(Continued)

(52) U.S. Cl.
CPC ....... *H04N 21/4334* (2013.01); *H04N 21/4335* (2013.01); *H04N 21/4347* (2013.01); *H04N21/4353* (2013.01); *H04N 21/4405* (2013.01); *H04N 21/44055* (2013.01); *H04N 21/4781* (2013.01); *H04N 21/47214* (2013.01); *H04N 21/8126* (2013.01)

(58) Field of Classification Search
USPC ........................... 725/31, 131, 134, 136, 114
See application file for complete search history.

(56) References Cited

U.S. PATENT DOCUMENTS

2003/0149985 A1\* 8/2003 Ohno et al. ...................... 725/58
2003/0208771 A1\* 11/2003 Hensgen et al. ............... 725/100
(Continued)

FOREIGN PATENT DOCUMENTS

| JP | 2002353918 | 12/2002 |
| JP | 2002368731 | 12/2002 |

(Continued)

OTHER PUBLICATIONS

International Preliminary Report on Patentability and Written Opinion for corresponding PCT Application PCT/JP2012/067103, dated Apr. 10, 2014.

(Continued)

*Primary Examiner* — Mulugeta Mengesha
(74) *Attorney, Agent, or Firm* — Matthew B. Dernier, Esq.

(57) ABSTRACT

Of the types of content included in a broadcast signal, a type of content different from broadcast content is selectively stored. A broadcast signal reception block receives a broadcast signal of a selected channel. A display control block controls such that broadcast content included in the broadcast signal received by the broadcast signal reception block is displayed on a display block. If storage content that is content identified to be stored is included in the broadcast signal received by the broadcast signal reception block, then a storage content output block outputs this storage content to a storage block.

16 Claims, 4 Drawing Sheets

(51) Int. Cl.
*H04N 21/81* (2011.01)
*H04N 21/435* (2011.01)
*H04N 21/472* (2011.01)
*H04N 21/4335* (2011.01)
*H04N 21/434* (2011.01)
*H04N 21/4405* (2011.01)
*H04N 21/478* (2011.01)

(56) References Cited

U.S. PATENT DOCUMENTS

2005/0091690 A1* 4/2005 Delpuch et al. ............... 725/88
2007/0050813 A1* 3/2007 Lee ................................ 725/40
2009/0172764 A1* 7/2009 Okamura ....................... 725/131

FOREIGN PATENT DOCUMENTS

| JP | 2000308025 | 1/2003 |
| JP | 2003087700 | 3/2003 |
| JP | 2003513559 A | 4/2003 |
| JP | 2003230059 A | 8/2003 |
| JP | 2007510316 A | 4/2007 |
| JP | 2009212854 | 9/2009 |
| WO | 0133852 A1 | 5/2001 |
| WO | 2007066614 | 6/2007 |

OTHER PUBLICATIONS

International Search Report for corresponding PCT Application PCT/JP2012/067103, dated Oct. 9, 2012.

* cited by examiner

F I G . 5

INFORMATION PROCESSING APPARATUS, INFORMATION PROCESSING SYSTEM, INFORMATION PROCESSING METHOD, TELEVISION PROGRAM BROADCASTING METHOD, PROGRAM, AND INFORMATION STORAGE MEDIA

TECHNICAL FIELD

The present invention relates to an information processing apparatus, an information processing system, a television program broadcasting method, a program, and an information storage media.

BACKGROUND ART

Technologies are known that are associated with data broadcasting for transmitting a broadcast signal that contains both data of moving images and audio (this data hereafter referred to as content subject to broadcasting) and data of still images and texts representative of news, weather forecast, and television program guides.

SUMMARY

Technical Problems

It is known that, when a broadcast signal including both content subject to broadcasting and content (game, movie, and music, for example) other than content subject to broadcasting is transmitted, for example, related-art technologies are unable to selectively store content other than content subject to broadcasting.

In view of the above-mentioned problems in the related art, it is an object of the present invention is the provision of selective storage of content other than content subject to broadcasting, these items of content being included in a broadcast signal.

Solution to Problems

In order to solve the above-mentioned problems, an information processing apparatus practiced as one embodiment of the present invention has reception means configured to receive a broadcast signal of a selected channel; display control means configured to control such that broadcast content included in a broadcast content received by this reception means is displayed on display means; and storage content output means configured, if storage content identified to be stored that is different from this broadcast content is included in a broadcast signal received by this reception means, to output this storage content to storage means.

An information processing system practiced as one embodiment of the present invention is an information processing system that includes a broadcasting station and a reception apparatus. This broadcasting station has transmission means configured to transmit a broadcast signal. This reception apparatus has reception means configured to receive a broadcast signal of a selected channel that is at least a part of a broadcast signal transmitted from this broadcasting station; display control means configured to control such that broadcast content included in a broadcast signal received by this reception means is displayed on display means; and storage content output means configured, if storage content identified to be stored that is different from this broadcast content is included in a broadcast signal received by this reception means, to output this storage content to storage means.

An information processing method practiced as one embodiment of the present invention has the steps of receiving a broadcast signal of a selected channel; controlling such that broadcast content included in a broadcast content received by this reception means is displayed on display means; and outputting, if storage content identified to be stored that is different from this broadcast content is included in a broadcast signal received by this reception means, this storage content to storage means.

A television program broadcasting method practiced as one embodiment of the present invention has the process of organizing a television program to be broadcast such as storage content to be stored in an information processing apparatus used by a user is provided to a user along with a television program that is broadcast content produced by a broadcasting organization, this television program being content related with this storage content; and transmitting a broadcast signal of an organized television program, this storage content being transmitted a plurality of times during broadcasting of a television program that is this broadcast content.

A program practiced as one embodiment of the present invention is a program for having a computer function as: reception means configured to receive a broadcast signal of a selected channel; display control means configured to control such that broadcast content included in a broadcast content received by this reception means is displayed on display means; and storage content output means configured, if storage content identified to be stored that is different from this broadcast content is included in a broadcast signal received by this reception means, to output this storage content to storage means.

An information storage media practiced as one embodiment of the present invention is a computer-readable information storage media storing a program for having computer function as: reception means configured to receive a broadcast signal of a selected channel; display control means configured to control such that broadcast content included in a broadcast content received by this reception means is displayed on display means; and storage content output means configured, if storage content identified to be stored that is different from this broadcast content is included in a broadcast signal received by this reception means, to output this storage content to storage means.

As described above and according to the present invention, storage content that is content identified to be stored and different from broadcast content is outputted into storage means, so that content different from broadcast content of the types of content included in a broadcast signal is selectively stored.

In one aspect of the present invention, the above-mentioned reception means receives a broadcast signal transmitted from a broadcasting station, the above-mentioned broadcasting station transmits a broadcast signal including the above-mentioned broadcast content and the storage content related with this broadcast content, and the above-mentioned broadcasting station repeatedly transmits the above-mentioned storage content related with above-mentioned broadcast content two or more times during the broadcasting of the above-mentioned storage content.

In another aspect of the present invention, if the channel of a broadcast signal to be received is changed after the outputting of a part of the above-mentioned storage content into storage means, the above-mentioned storage content output means outputs the remaining part of this storage content to storage means when the channel of the broadcast signal including the part of the above-mentioned storage content is selected again as the channel of a broadcast signal to be received.

In still another aspect of the present invention, if broadcast content included in the broadcast signal at the reception of the above-mentioned broadcast signal is not displayed, then the above-mentioned storage content output means controls such that the storage content included in this broadcast signal is not stored in storage means.

In yet another aspect of the present invention, if the broadcast content included in the above-mentioned broadcast signal is stored in storage means, then the above-mentioned storage content output means controls such that the storage content included in this broadcast signal is not stored in storage means.

In a different aspect of the present invention, the above-mentioned reception means receives broadcast signals of two or more selected channels, the above-mentioned display control means controls such that broadcast content included in the broadcast signal of any one of the two or more channels is displayed on display means, and the above-mentioned storage content output means outputs to storage means the above-mentioned storage content included in the broadcast signal of a channel different from the channel of the broadcast signal in which the broadcast content controlled to be displayed by the above-mentioned display means is included.

In a further different aspect of the present invention, storage content included in a broadcast signal to be received by the above-mentioned reception means is encrypted and therefore decryption means for decrypting the above-mentioned storage content with the decryption key of the above-mentioned storage content is further arranged.

In a still different aspect of the present invention, a decryption key proving apparatus connected through a network further has decryption key transmission output means for outputting a transmission request for the decryption key of the above-mentioned storage content and decryption key reception means for receiving a decryption key transmitted from the above-mentioned decryption key providing apparatus in response to a request for the provision of above-mentioned decryption key, the above-mentioned decryption means decrypting the above-mentioned storage content with the received decryption key.

In a separate aspect of the present invention, decryption key reading means for reading a decryption key from an information storage media in which the decryption key of the above-mentioned storage content is stored and the above-mentioned decryption means decrypts the above-mentioned storage content with the read key.

In a still separate aspect of the present invention, the above-mentioned decryption means, connectable with a decryption key generating apparatus for generating the decryption key of the above-mentioned storage content on the basis of the data included in a broadcast signal in which the above-mentioned storage content is included, obtains the decryption key generated by the above-mentioned decryption key generating apparatus to decrypt the above-mentioned storage content with the obtained decryption key.

BRIEF DESCRIPTION OF DRAWINGS

FIG. 5 is a diagram illustrating one example of an electronic program guide.

DESCRIPTION OF EMBODIMENTS

The following describes in detail one embodiment of the present invention with reference to the above-mentioned drawings.

Figure 1:
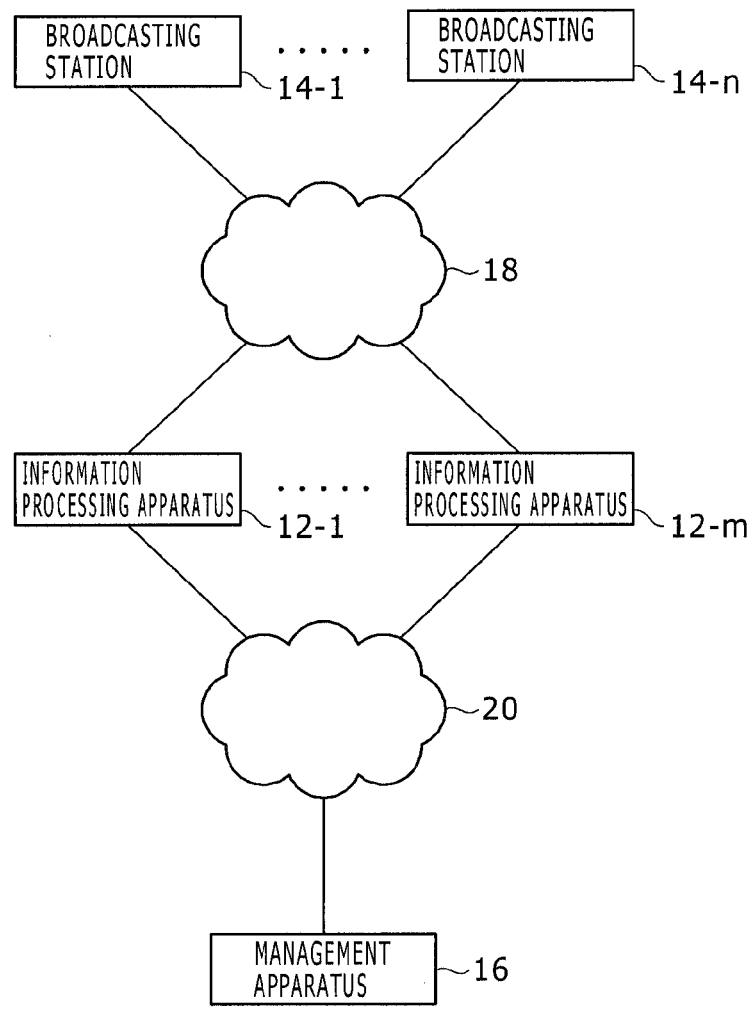
FIG. 1 is a schematic diagram illustrating an overall configuration of a broadcasting system practiced as one embodiment of the present invention.

Now, referring to FIG. 1, there is shown one example of the overall configuration of a broadcasting system 10 practiced as one embodiment of the present invention. As shown in FIG. 1, the broadcasting system 10 practiced as one embodiment of the present invention includes two or more information processing apparatuses 12 (12-1 through 12-$m$), two or more broadcasting stations 14 (14-1 through 14-$n$), and a management apparatus 16. Every information processing apparatus 12 practiced as the present embodiment is connected to every broadcasting station 14 through a broadcasting network 18 (wired or wireless) and to the management apparatus 16 through a communication network 20 (wired or wireless). In this configuration, the information processing apparatus 12 practiced as the present embodiment receives a broadcast signal transmitted from the broadcasting station 14. It should be noted that the information processing apparatus 12 and the management apparatus 16 are communicable with each other.

The information processing apparatus 12 includes a control block that is a program control device such as a CPU or the like that operates as instructed by a program installed in the information processing apparatus 12, a storage block made up of a storage element such as a ROM or a RAM or made up of a hard disk drive or the like, a communication block that is a communication interface such as a network board, a broadcast reception block made up of an antenna, television broadcast tuner, a broadcast signal decoder and the like that receives a broadcast signal from the broadcasting station 14 through the broadcasting network 18, an operator block such as a remote controller or the like, and a display block made up of a liquid crystal display, an organic EL display, or the like, for example. The above-mentioned block are interconnected via a bus. In the information processing apparatus 12 practiced as the present embodiment, the broadcast reception block has two or more television broadcasting tuners and therefore can receive broadcast signals of two or more channels. In addition, the storage block of the information processing apparatus 12 stores a program that is executed by the control block of the information processing apparatus 12. Further, the storage block of the information processing apparatus 12 functions as a work memory of the information processing apparatus 12. It should be noted that the present embodiment assumes that one unit of information processing apparatus 12 is for use by one or more users belonging to one family, for example.

In the present embodiment, the broadcasting station 14 outputs a broadcast signal that includes at least one of content to be broadcast (broadcast content BC) and content to be stored (storage content SC). Thus, the broadcasting station 14 includes transmission means for transmitting broadcast signals. For example, in transmitting a broadcast signal based on ISDB-T method, the broadcasting station 14 uses a part of 13 segments constituting one channel for the transmission of broadcast content BC and at least a part of the remaining segments for the transmission of storage content SC. Obviously, depending on time zones, the broadcasting station 14 may change the number of segments for use in the transmission of broadcast content BC or the number of segments for use in the transmission of storage content SC. Further, in midnight time zones in which no broadcasting is executed, all segments may be used for the transmission of storage content SC, for example. Obviously, the method in which the broadcasting station 14 transmits broadcast signals is not limited to ISDB-T method; for example, broadcast signals may be transmitted on the basis of DVB-T method or ATS-C method. In addition, in the present embodiment, storage content SC is divided into UDP packets to be transmitted from the broadcasting station 14 to the information processing apparatus 12. It should be noted that the method of the transmission of UDP packets is not limited to a specific one; for example, UDP packets may be transmitted from the broadcasting station 14 to the information processing apparatus 12 in the form of broadcast signals mounted in accordance with a UDP protocol or from the broadcasting station 14 to the information processing apparatus 12 after converting a UDP stream into a transport stream in an MPEG-2 system.

Further, in the present embodiment, storage content SC is related with storage identification information indicative that the content concerned is to be stored. To be more specific, PSI/SI information in each transport stream of the MPEG-2 system included in storage content SC indicates that the content concerned is storage content SC, for example. Hence, the information processing apparatus 12 is configured to extract storage content SC from a broadcast signal transmitted from the broadcasting station 14 on the basis of PSI/SI information for example. Further, in the present embodiment, some pieces of the storage content that is transmitted from the broadcasting station 14 to the information processing apparatus 12 are encrypted partially or totally.

In addition, in the present embodiment, the broadcasting station 14 transmits a broadcast signal in which broadcast content BC and storage content SC (for example, storage content SC common to broadcast content in content type) related with this broadcast content to the information processing apparatus 12. For example, the broadcasting station 14 transmits a broadcast signal that includes a baseball live television program as broadcast content BC and a baseball game playing program as storage content SC to the information processing apparatus 12. In the present embodiment, broadcast content BC is produced by broadcasting organizations, while storage content SC is produced by business entities that produce and distribute game programs, for example. Then, broadcasting organizations obtain the storage content SC produced by business entities and put the obtained storage content SC into a broadcast signal. As described above, in the present embodiment, each television program is organized such that storage content SC is offered to each user along with a television program that is broadcast content BC by a broadcasting organization. It should be noted that the producers of broadcast content BC and storage content SC are not restricted to those mentioned above. For example, both broadcast content BC and storage content SC may be produced by a broadcasting organization or both broadcast content BC and storage content SC may be produced by a business entity that produces and distributes game programs.

Figure 2:
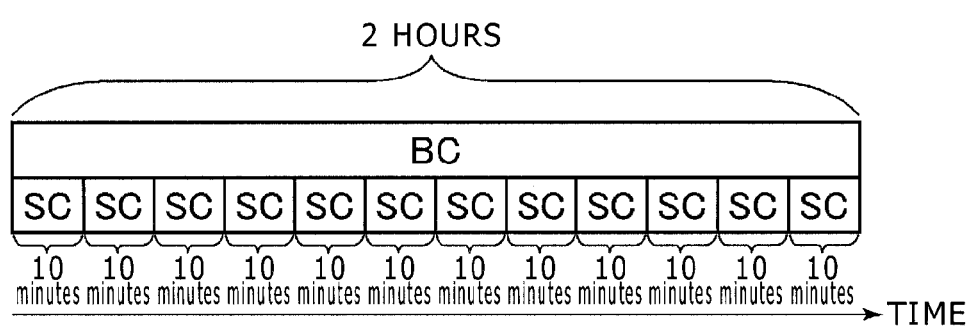
FIG. 2 is a diagram illustrating one example of the relation between the transmission time of content subject to broadcasting and the transmission time of content subject to storage.

Next, in the present embodiment, the broadcasting station 14 transmits the storage content SC related with broadcast content BC to the information processing apparatus 12 two or more times repeatedly during the broadcasting of one television program (namely, during a period in which one television program is transmitted as broadcast content BC) as shown in FIG. 2. FIG. 2 illustrates an example of a relation between the transmission time of broadcast content BC and the transmission of storage content SC in the case where the time necessary for the transmission of an entire game program of baseball game that is storage content SC is 10 minutes and the time (namely, a baseball live broadcasting time) in which a television program of live baseball coverage that is the broadcast content BC to be transmitted with the above-mentioned storage content SC is two hours. A shown in FIG. 2, in the present embodiment, a game program of baseball game is transmitted 12 times during the two hours that is the broadcasting time of a baseball live coverage.

The management apparatus 16, constructed by a general-purpose server computer for example, plays roles of providing a decryption key for decrypting encrypted content to the information processing apparatus 12, computing an amount of profit share for the broadcasting station 14, and so on. In the present embodiment, the management apparatus 16 stores beforehand a decryption key for use in decrypting the storage content to be transmitted from the broadcasting station 14 to the information processing apparatus 12.

Figure 3:
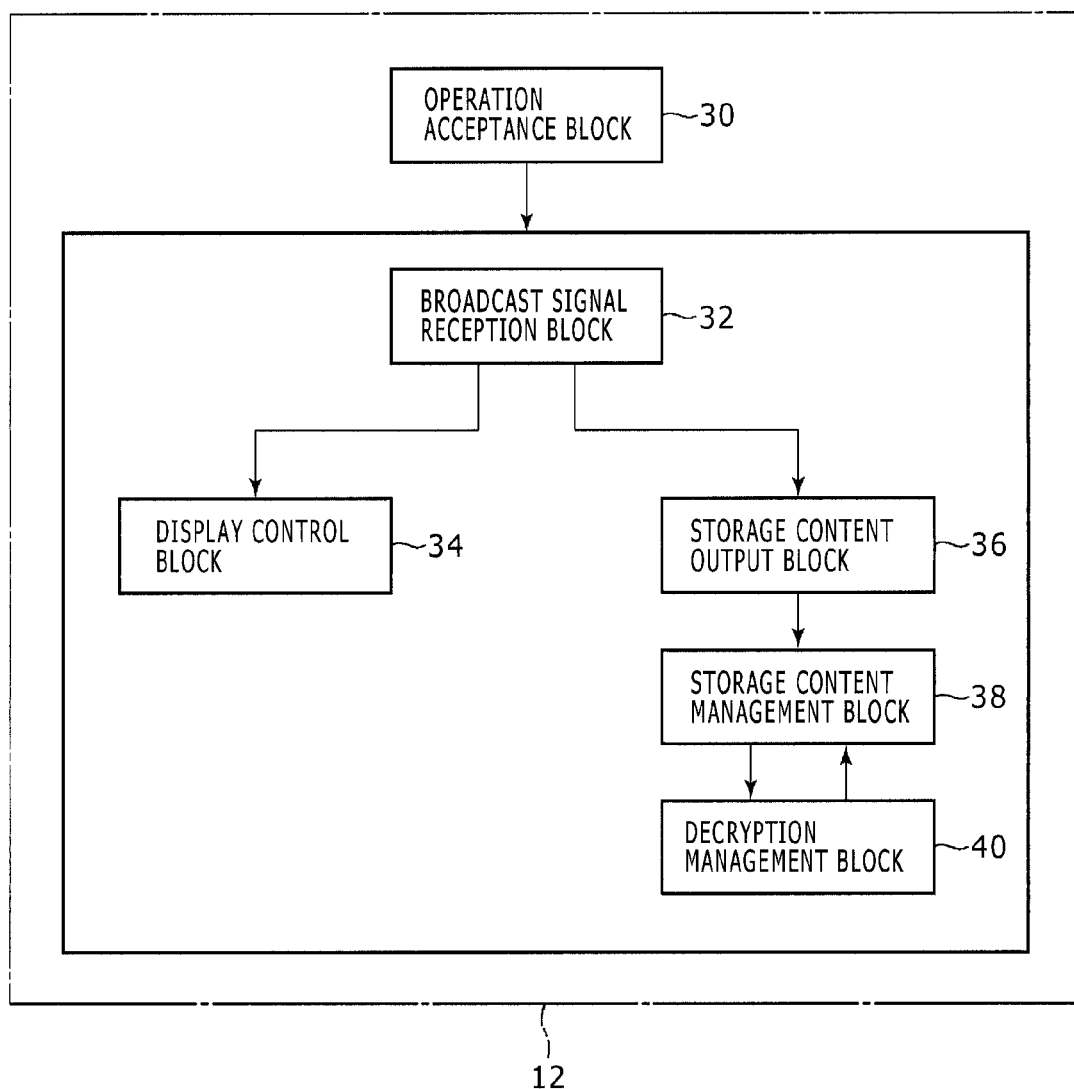
FIG. 3 is a block diagram illustrating one example of a function that is implemented by an information processing apparatus practiced as one embodiment of the present invention.

The following describes functions that are implemented by the information processing apparatus 12 practiced as the present embodiment. Referring to FIG. 3, there is shown a functional block diagram illustrating one example of functions that are implemented by the information processing apparatus 12 practiced as the present embodiment. As shown in FIG. 3, the information processing apparatus 12 practiced as the present embodiment functions as including an operation acceptance block 30, a broadcast signal reception block 32, a display control block 34, a storage content output block 36, a storage content management block 38, and an encryption management block 40. In the present embodiment, these functions are implemented by executing a program installed on the information processing apparatus 12 that is a computer. This program is supplied to the information processing apparatus 12 via computer-readable information transmission media such as CD-ROM, DVD-ROM, or the like, or a communication network such as the Internet, for example. It should be noted that a part or all of the functions shown in FIG. 3 may be implemented by hardware such as circuit elements.

The operation acceptance block 30 accepts operation signals from an operator block such as a remote controller or the like.

The broadcast signal reception block 32 receives broadcast signals transmitted from the broadcasting station 14. In addition, in the present embodiment, the broadcast signal reception block 32 receives a broadcast signal of a channel that is determined in accordance with a setting operation (or a switching operation) of a reception channel that is accepted by the operation acceptance block 30. In addition, as described above, the broadcast signal reception block 32 is configured to be capable of receiving the broadcast signals of two or more channels.

The display control block 34 generates a moving image on the basis of the broadcast content BC included in a broadcast signal received by the broadcast signal reception block 32 and displays the generated moving image on the display block such as a display monitor. Thus, if broadcast content BC is a baseball live coverage for example, the user of the information processing apparatus 12 is able to view the baseball live coverage.

If the broadcast signal received by the broadcast signal reception block 32 includes storage content SC that is different from broadcast content BC and is identified to be stored, then the storage content output block 36 outputs the storage content SC to the storage block. In the present embodiment, the storage content output block 36 identifies the storage content SC included in a broadcast signal received by the broadcast signal reception block 32 on the basis of information indicative of content to be stored (PSI/SI information for example) related with this storage content SC and outputs the identified storage content SC to the storage block of the information processing apparatus 12. In the present embodiment, a game program that is storage content SC is stored in the storage block as an executable file. In addition, in the present embodiment, before outputting storage content SC to the storage block, the storage content output block 36 generates log information that includes the identifier of this storage content SC, the identifier of the broadcasting station 14 from which this storage content SC is transmitted, the time at which the storage of this storage content SC into the storage block starts, the time at which the storage of this storage content SC ends, the length of time of storage of this storage content SC into the storage block, the information amount of the storage content SC transmitted from the broadcasting station 14 to the information processing apparatus 12, and the like, and outputs the generated log information to the storage block.

In the present embodiment, displaying of the broadcast content BC included in the broadcast signal of a channel selected by the user (namely, displaying of a television program being broadcast) and outputting of the storage content SC included in the broadcast signal of this channel are executed concurrently. To be more specific, in the present embodiment, the storage content SC transmitted by the broadcasting station 14 is outputted to the storage block, while a television program is simultaneously transmitted along with the storage content SC and viewed by the user.

The storage content management block 38 executes the processing related with the storage content SC stored in the storage block. In the present embodiment, in accordance with an operation of displaying a list of the storage content SC that is received by the operation acceptance block 30, a storage content list screen on which the information (titles for example) for identifying the storage content SC stored in the storage block is displayed on the display block such as a display monitor. Next, if an operation for selecting any one piece of the displayed storage content SC is accepted by the operation acceptance block 30 while the storage content list screen is displayed, for example, then the storage content management block 38 executes the processing depending on the selected piece of storage content SC. If the selected storage content SC is a game program for example, then the storage content management block 38 executes this game program; if the selected storage content SC is a movie or music, then the storage content management block 38 reproduces the movie content or the music content. Next, the screen generated by the execution of the processing done by the storage content management block 38 is displayed by the display control block 34 on the display block such as a display monitor. In addition, the storage content management block 38 instructs the decryption management block 40 to obtain the decryption key corresponding to this storage content SC with a predetermined timing (when the processing related with the encrypted storage content SC is initially executed or the validity of decryption key has expired, for example).

In accordance with the instruction received from the storage content management block 38 for obtaining the decryption key, the decryption management block 40 outputs a request for transmitting the decryption key to the management apparatus 16. This transmission request is related with the identifier of the storage content SC to be decrypted, for example. Next, in response to this transmission request, the management apparatus 16 transmits, to the information processing apparatus 12, the decryption key corresponding to the storage content SC to be decrypted and being identified on the identifier related with the transmission request. Then, receiving this decryption key, the decryption management block 40 decrypts the storage content SC corresponding to this decryption key by use thereof. Next, when the decryption ends, the decryption management block 40 notifies the storage content management block 38 of the end of the decryption.

Further, the information processing apparatus 12 practiced as the present embodiment executes charge processing on the user of the information processing apparatus 12 with respect to the decrypted storage content SC at the end of the decryption processing, for example. Thus, in the present embodiment, the decrypted storage content SC is pay content and therefore the user must pay the price of the storage content SC that is pay content when using the same.

Receiving a message indicative of the completion of decryption from the decryption management block 40, the storage content management block 38 starts executing the processing related with the decrypted storage content SC.

In addition, in the present embodiment, the storage content management block 38 transmits log information to the management apparatus 16 with a predetermined timing (at predetermined time intervals for example). Then, the management apparatus 16 stores the received log information.

Figure 4:
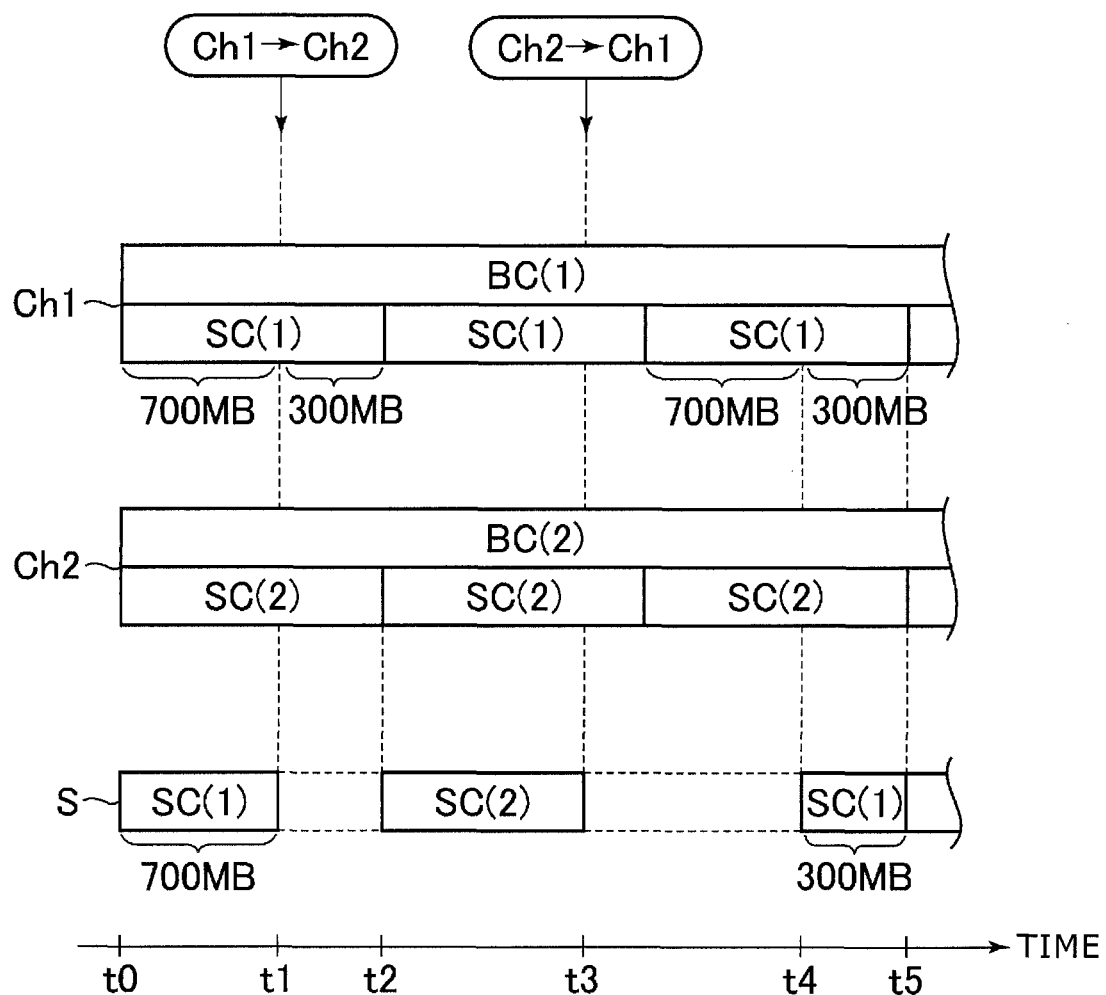
FIG. 4 is a diagram illustrating one example of an operation of the information processing apparatus practiced as one embodiment of the present invention.

The following describes one example of an operation of the information processing apparatus 12 practiced as the present embodiment that is executed when channel switching occurs while the storage content SC included in a broadcast signal is being stored in the storage block with reference to the schematic diagram shown in FIG. 4. As shown in FIG. 4, the broadcast signal transmitted from the broadcasting station 14 corresponding to the first channel is represented by Ch1, the broadcast signal transmitted from the broadcasting station 14 corresponding to the second channel is represented by Ch2, and the storage status of the storage content SC in the storage block of the information processing apparatus 12 is represented by S. Then, as shown in FIG. 4, a broadcast signal including broadcast content BC(1) and storage content SC(1) is transmitted from the broadcasting station 14 corresponding to the first channel. A broadcast signal including broadcast content BC(2) and storage content SC(2) is transmitted from the broadcasting station 14 corresponding to the second channel. In what follows, assume that the information amount of storage content SC(1) be 1 GB.

Assume here that, in the information processing apparatus 12, storage of storage content SC(1) transmitted from the first channel into the storage block have started at time t0. Next, assume that, at time t1, the information processing apparatus 12 receive the broadcast signal from the broadcasting station 14 corresponding to the second channel in response to a channel switching operation from the first channel to the second channel done by the user. Then, outputting of storage content SC(1) to the storage block is discontinued. Also assume that, up to here, for storage content SC(1), a part of 700 MB from the head packet to be transmitted have stored in the storage block. Next, the information processing apparatus 12 starts storing of storage content SC(2) transmitted from the broadcasting station 14 corresponding to the second channel into the storage block at time t2 immediately after time t1, at which the head packet of storage content SC(2) from the broadcasting station 14 corresponding to the second channel is transmitted. Subsequently, assume that, at time t3, the information processing apparatus 12 become ready for receiving a broadcast signal from the broadcasting station 14 corresponding to the first channel again in response to a channel switching operation from the second channel to the first channel done by the user. Then, the information processing apparatus 12 restarts storing of storage content SC(1) transmitted from the broadcasting station 14 corresponding to the first channel into the storage block (namely, starts storing of the remaining portion of 300 MB of the storage content SC(1)) at time t4 immediately after time t3, at which the transmission of the portion of the storage content SC(1) from the broadcasting station 14 corresponding to the first channel, this portion not having stored in the storage block. Next, at time t5, all of storage content SC(1) is stored in the storage block.

As described above, in the present embodiment, the different pieces of storage content SC are switched between in response to a channel switching operation done by the user. Then, when the selected channel is switched (the operation acceptance block 30 accepts a channel switching operation) before all of the storage content SC is outputted to the storage block, the outputting of this storage content SC to the block is discontinued halfway, thereby disabling the user to use this storage content SC (for example, the user is incapable of executing a game program). However, in the present embodiment, after the switching to the original channel done by the user for the reception of storage content SC, the storage content output block 36 detects the reception of subsequent packets of the stored storage content SC (packets of the storage content SC not yet stored) on the basis of the information and the like of the header of packets of storage content SC for example, thereby restarting outputting of this storage content SC to the storage block. Then, the remaining portion of the storage content SC is stored in the storage block. Next, when all of the storage content SC has been stored in the storage block, the entire storage content SC concerned is handled as one integrated file.

In addition, the management apparatus 16 practiced as the present embodiment computes the amounts to be paid to the above-mentioned broadcasting stations 14 on the basis of the log information received from the information processing apparatus 12. For example, if a part of the sale profit of storage content SC (for example, a part of the total of the amounts charged on the user as described above) is the total of the paid amount to the broadcasting station 14, the management apparatus 16 computes the amounts obtained by dividing this total amount by the ratio of time in which each broadcasting station 14 transmitted this storage content SC and the ratio of the information volume with which each broadcasting station 14 transmitted this storage content SC, as the amount to be obtained by each broadcasting station 14. Then, the amount computed as described above is paid to each broadcasting station 14.

For example, assume that particular storage content SC(n) be transmitted from both the broadcasting station 14 corresponding to the first channel and the broadcasting station 14 corresponding to the second channel. Next, assume that, after receiving a portion of storage content SC(n) from the broadcasting station 14 corresponding to the first channel for seven minutes, the information processing apparatus 12 receive the remaining portion of storage content SC(n) from the broadcasting station 14 corresponding to the second channel for three minutes, resulting in the storing of the entire storage content SC(n) into the information processing apparatus 12. Then, for example, the management apparatus 16 identifies a portion of a charge amount as a distribution total on the basis of a charge amount to the user of the information processing apparatus 12 in terms of storage content SC(n) and computes 70% of the identified distribution amount as a distribution amount for the broadcasting station 14 corresponding to the first channel and remaining 30% as a distribution amount for the broadcasting station 14 corresponding to the second channel.

It should be noted that the management apparatus 16 may compute the distribution ratios on the basis of other elements than those mentioned above, such as the ratio between the amounts of transmitted information for example. For example, assume that, after receiving 600 MB of storage content SC(n) from the broadcasting station 14 corresponding to the first channel, the information processing apparatus 12 receive the remaining 400 MB of storage content SC(n) from the broadcasting station 14 corresponding to the second channel, resulting in the storing of storage content SC(n) into the information processing apparatus 12. In this case, the management apparatus 16 may compute 60% of the distribution amount for storage content SC(n) as a distribution amount to the broadcasting station 14 corresponding to the first channel and 40% of the distribution amount as a distribution amount to the broadcasting station 14 corresponding to the second channel, for example.

Figure 5:
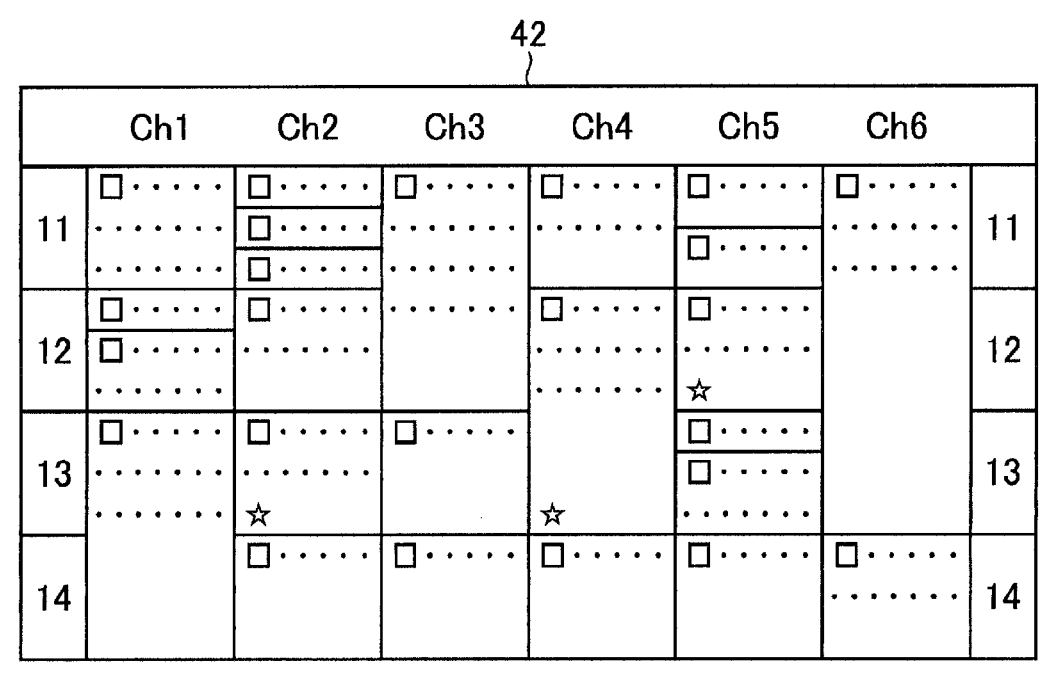

Further, in the present embodiment, an electronic program guide (EPG) 42 illustrated in FIG. 5 allows the storage reservation of storage content SC. The electronic program guide 42 is shown on the display block such as a display monitor in accordance with an operation done for displaying the electronic program guide 42 accepted by the operation acceptance block 30, for example. The electronic program guide 42 practiced as the present embodiment is configured to be capable of the recording reservation of television programs, television program content specified by the user as a target of recording reservation being stored in the storage block of the information processing apparatus 12. In addition, the electronic program guide 42 illustrated in FIG. 5 shows the pieces of storage content SC that can be reserved for storage are indicated by symbols (stars in the example shown in FIG. 5). The present embodiment is also configured to allow the user to specify television programs subject to the storage reservation of storage content SC in virtually the same manner as the recording reservation of television programs in the electronic program guide 42.

Then, in the present embodiment, the broadcast signal reception block 32 receives a broadcast signal that includes broadcast content BC corresponding to the television program specified for the storage reservation of storage content SC and the storage content SC to be reserved for storage, the display control block 34 displays a moving image generated on the basis of this broadcast content BC onto the display block such as a display monitor, and the storage content output block 36 outputs this storage content SC to the storage block.

In the present embodiment, storage content SC that is different from broadcast content BC and identified as content to be stored is outputted to the storage block of the information processing apparatus 12, so that the storage content SC of the content included in each broadcast signal is selectively stored.

It should be noted that the present invention is not restricted to the above-mentioned embodiment.

For example, control may be executed such that, an image generated by the execution of the processing related with storage content SC when the storage content SC that is an application program is stored in the storage block of the information processing apparatus 12 by the information processing apparatus 12 is displayed on the display block such as a display monitor (for example, an image generated by the execution of the processing related with storage content SC is displayed as an image that occupies a part of an image of a television program being broadcast) along with an image of a television program being broadcast (the broadcast content BC related with the storage content SC). Also, the broadcasting station 14 may transmits, to the information processing apparatus 12, a control signal for providing control such that an image generated by the execution of the processing related with storage content SC provides an image (an image in accordance with the current broadcast contents of a television program being broadcast) in response to the progression of a television program being broadcast. It should be noted that this control signal may be transmitted a part of storage content SC or broadcast content BC or as a signal separate from storage content SC or broadcast content BC. Receiving the control signal, the information processing apparatus 12 may switch between the contents displayed on the display block so as to display an image corresponding to the contents of the control signal to be displayed on the display block as an image that is generated by the execution of the processing related with storage content SC. Also, control may be provided such that, when a television program that is broadcast content BC is rebroadcast or the broadcasting of next broadcast is started, the information processing apparatus 12 activates an application program that is storage content CS transmitted with broadcast content in accordance with the starting of broadcasting so that an image generated by the execution of the application program is displayed on the display block along with an image of the broadcast television program.

In addition, data indicative of the conditions about the combinations of the information processing apparatus 12 that permits the decryption of storage content SC and users (for example, the combinations of the identifier of the information processing apparatus 12 (device ID) and user IDs of the users of the information processing apparatuses 12) may be stored in the management apparatus 16 in advance. Further, the information processing apparatus 12 may transmit, to the management apparatus 16, a transmission request for the decryption key related with the identifier of the storage content SC to be decrypted, the device ID of the own apparatus, and the user ID of the user of the own apparatus. Still further, when the management apparatus 16 executes authentication processing based on the combinations of the received device ID and user IDs and, if the authentication is successful (for example, if the combinations of the received device ID and user IDs are stored in the storage block), then the management apparatus 16 may transmit the decryption key to the information processing apparatus 12; if the authentication processing is unsuccessful, then the management apparatus 16 may transmit a message indicative thereof to the information processing apparatus 12.

Also, the management apparatus 16 may execute the above-mention authentication processing only with the user IDs rather than the combinations of the received device ID and user IDs.

In addition, before the storing of storage content SC into the storage block is started, the information processing apparatus 12 may transmit a transmission request for the decryption key corresponding to this storage content SC to the management apparatus 16. Then, if the authentication processing in the management apparatus 16 is successful and the information processing apparatus 12 receives the decryption key from the management apparatus 16, the storage content SC may be stored in the storage block; otherwise (if the authentication is unsuccessful), the storage content SC may not be stored in the storage block, for example. Further, when the storing of storage content SC into the storage block is started, if the decryption key for use in decrypting this storage content SC has already been stored in the storage block, the information processing apparatus 12 may store the storage content SC into the storage block; otherwise, the information processing apparatus 12 may not store the storage content SC into the storage block, for example.

Also, decryption keys may be transmitted from the management apparatus 16 to the information processing apparatus 12 for those users who pay fixed charges to a broadcasting organization with respect to storage content SC transmitted from this broadcasting organization for a period corresponding to the fixed charge (one month for example) regardless of the contents of the storage content SC, for example. Alternatively, when the above-mentioned payment of the fixed charge by the user is confirmed, an decryption key capable of decrypting all of storage content SC transmitted from the broadcasting station 14 operated by the broadcasting organization to which the fixed charge was paid may be transmitted from the broadcasting station 14 or the management apparatus 16 to the information processing apparatus 12 for a predetermined period, this description key being stored in the storage block of the information processing apparatus 12, for example.

Storage content SC may be content that is free of charge. In this case, information indicative of the viewing time of broadcast content BC (advertisement content for example) transmitted from the broadcasting station 14 along with this storage content SC may be transmitted from the information processing apparatus 12 to the management apparatus 16. Then, in the management apparatus 16, the viewing time and audience rating of the advertisement content may be computed, the information indicative of the computed viewing time and audience rating being transmitted to the advertiser of this advertisement content.

Besides, if, because of all of broadcast content has not been viewed for example, the entire storage content SC is not stored in the storage block, the information processing apparatus 12 may delete this storage content SC when a predetermined period has passed or it is found by the electronic program guide 42 or the like that there is no transmission schedule for this storage content, for example.

Further, storage content SC that is transmitted from the broadcasting station 14 along with a television program being viewed need not be always stored in the storage block and, for example, if the storage content SC specified by the user in advance is received, then this storage content SC may be stored in the storage block.

Still further, for example, the broadcasting station 14 from which a television program being viewed by the user is transmitted may differ from the broadcasting station 14 from which the storage content SC to be outputted to the storage block while this television program is being viewed by the user. For example, while the broadcast signal reception block 32 is receiving a broadcast signals of the first channel and the second channel, the display control block 34 may control such that the broadcast content BC included in the broadcast signal of the first channel is displayed on the display block and, at the same time, the storage content output block 36 may output the storage content SC included in the broadcast signal of the second channel to the storage block. This function is implemented by arranging two or more television broadcasting tuners in the broadcasting reception block of the information processing apparatus 12, for example.

In addition, if, while a television program is being broadcasted, this television is not viewed by the user (during the reception of a broadcast signal, the broadcast content BC included in this broadcast signal is not displayed on the display block such as a display monitor), for example, then the storage content output block 36 controls such that the storage content SC transmitted from the broadcasting station 14 along with this television program is not stored in the storage block. This control allows the user to obtain the storage content SC transmitted along with the broadcast content BC of a television program only when the user views this television program without recording the same. Besides, if a television program is recorded (the timer recording of a television program), then the storage content output block 36 may control such that the storage content SC transmitted from the broadcasting station 14 along with this television program is not stored in the storage block.

Conversely, if a television program is recorded (the timer recording of a television program for example), then the storage content output block 36 may control such that the storage content SC transmitted from the broadcasting station 14 along with this television program is stored in the storable block. Thus, not only the content of a television program is stored (recorded), but also the storage content SC transmitted along with the broadcast content BC of this television program is stored.

In addition, for example, if a television program is viewed by the user, the storage content granted a special favor is stored in the storage block, and if this television program is timer-recorded by the user, then the storage content SC granted a special favor may not be stored in the storage block. For example, if a television program in which a favorite television personality performs is viewed by the user, a collection of still pictures (a photographic collection) of this television personality taken during the performance in this television program may be stored in the storage block. In this case, when the broadcasting station 14 transmits a control signal permitting the storage of a collection of still pictures (a photographic collection) of a television personality to the information processing apparatus 12 and only after this control signal is received by the information processing apparatus 12, the information processing apparatus 12 may store the collection of still pictures (the photographic collection) of the television personal into the storage block, for example. Also, receiving the log information indicative that this television program has been viewed, the management apparatus 16 may distribute the collection of still images (the photographic collection) of this television personality taken during the performance in this television program to the information processing apparatus 12 (or, in response to a transmission command from the management apparatus 16 to the broadcasting station 14, the broadcasting station 14 may distribute the collection of still pictures (the photographic collection) of this television personality taken during the performance in this television program to the information processing apparatus 12), for example.

Besides, a configuration may provided that, if the user executes both the timer recording of a television program and the storage reservation of storage content SC for a same time zone and a same channel, for example, the use of restricted content that is a part of the storage content SC is allowed (for example, the decryption key of restricted content becomes available).

Also, a configuration may be provided that the storage content SC included in the broadcast signal of a selected channel or a predetermined channel is stored in the storage block for a time zone in which the user is not viewing a television program or a time zone in which no television program is being broadcast, for example. Further, the content transmitted as storage content SC along with broadcast content BC from the broadcasting station 14 in a time zone in which broadcasting is being executed (daytime for example) may be retransmitted from the broadcasting station 14 to the information processing apparatus 12 in a time zone (midnight for example) in which no television program is being broadcast, for example.

In addition, storage content (SC) (or a part thereof) transmitted from the broadcasting station 14 during the broadcasting of one television program may be modified. For example, the first half of storage content SC may be repeatedly transmitted from the broadcasting station 14 to the information processing apparatus 12 in the first half of a television program and, in the last half of this television program, the last half of this storage content SC may be repeatedly transmitted from the broadcasting station 14 to the information processing apparatus 12.

Further, the storage content management block 38 may delete the storage content SC of which predetermined storage time from the storing thereof has passed from the storage block. Still further, in response to a delete operation received from the user, the storage content management block 38 may delete the specified storage content SC from the storage block.

Still further, the information processing apparatus 12 may obtain a decryption key in a method other than obtaining a decryption key from the management apparatus 16, for example. For example, the information processing apparatus 12 may read an information storage media (CD-ROM, DVD-ROM, Blu-ray (registered trademark) disc, USB memory, flash memory, or the like) that is purchased by a user and recorded with a decryption key to execute the decryption of storage content SC with the read decryption key.

Yet further, a decryption key generating apparatus connected to the information processing apparatus 12 with a USB cable or the like may read the data (header or the like for example) included in storage content SC, generate a decryption key on the basis of this read data, and output the generated decryption key to the information processing apparatus 12, for example. Next, the decryption management block 40 may obtain the decryption key outputted from the decryption key generating apparatus to execute the decryption of the storage content with the obtained decryption key.

In addition, for the already stored storage content SC, the storage content output block 36 may control such that this storage content is not stored in the storage block after the reception by the broadcast signal reception block 32.

Further, a character string (or a numeric string) in which the characters or numbers indicative of the answers to quizzes submitted in a television program that is quiz television show are arranged from the first question to the last question may be the password for the decryption of storage content SC. Also, when the user calls the customer service of the owner of the broadcasting station 14 or the management apparatus 16, storage content may become ready for use.

Besides, only a part of storage content SC may be encrypted. Then, only when the encrypted part is decrypted with the decryption key, the execution related with the partially encrypted storage content may be enabled.

In addition, storage content SC is not restricted to a game program; for example, storage content SC may be movie content or music content.

Further, the information processing apparatus 12 mentioned above may be configured by two or more housings. Still further, the above-mentioned specific character strings and the specific character strings used in the above-mentioned drawings are illustrative only and therefore not restricted to these specific character strings.

The invention claimed is:

1. An information processing apparatus, comprising:
   a reception unit configured to receive a broadcast signal of a selected channel;
   a display control unit configured to control such that broadcast content included in a broadcast content received by said reception unit is displayed on a display unit; and
   a storage content output unit configured to generate log information including an identifier of storage content, that is different from said broadcast content and is included in a broadcast signal received by said reception unit,
   wherein the storage content output unit is further configured to output said storage content to a storage unit;
   wherein the display control unit is further configured to display a list including the storage content output to the storage unit;
   an operation acceptance unit configured to receive a selection of the storage content from the list;
   a storage content management unit configured to obtain a decryption key related to the identifier of the selected storage content;
   wherein the information processing apparatus is configured to execute payment processing related to the selected storage content.

2. The information processing apparatus according to claim 1, wherein said reception unit receives a broadcast signal transmitted from a broadcasting station; said broadcasting station transmits a broadcast signal including said broadcast content and said storage content related with said broadcast content; and said broadcasting station repeatedly transmits said storage content related with said broadcast content a plurality of times.

3. The information processing apparatus according to claim 2, wherein, if a channel of a broadcast signal to be received is changed after a part of said storage content is outputted to a storage block, then said storage content output unit outputs a remaining part of said storage content to said storage unit if a channel of a broadcast signal including the part of said storage content is selected again as a channel of a broadcast signal to be received.

4. The information processing apparatus according to claim 2, wherein, if broadcast content included in said broadcast signal is not displayed at reception of said broadcast signal, then said storage content output unit controls such that storage content included in said broadcast signal is not stored in said storage unit.

5. The information processing apparatus according to claim 2, wherein, if broadcast content included in said broadcast signal is stored in said storage unit, then said storage content output unit controls such that the storage content included in said broadcast signal is not stored in the storage unit.

6. The information processing apparatus according to claim 3, wherein the storage content is divided into packets which are identified by packet header information, wherein packets belonging to said remaining part of said storage content are identified and distinguished, through said packet header information, from packets belonging to said part of said storage content that is outputted to the storage block before the channel was changed, and wherein said part of said storage content that is outputted to the storage block before the channel was changed and the remaining part outputted after the channel including said part of said storage content is selected again are combined as an entire storage content.

7. The information processing apparatus according to claim 1, wherein: said reception unit receives broadcast signals of a plurality of selected channels; said display control unit controls such that broadcast control included in any one of the broadcast signals of said plurality of channels is displayed on said display unit; and said storage content output unit outputs said storage content to said storage unit, said storage content being included in a broadcast signal of a channel different from a channel of broadcast signal which has broadcast content controlled to be displayed by said display control unit.

8. The information processing apparatus according to claim 1, wherein: storage content included in a broadcast signal received by said reception unit is encrypted, said information processing apparatus further comprising: a decryption unit configured to decrypt said storage content with a decryption key of said storage content.

9. The information processing apparatus according to claim 8, wherein a decryption key providing apparatus is connected through a network, and further includes: a decryption key transmission request output unit configured to output a transmission request for a decryption key of said storage content, and a decryption key reception unit configured to receive a decryption key transmitted from said decryption key providing apparatus in response to a request for providing said decryption key; and said decryption unit is configured to decrypt said storage content with a received decryption key.

10. The information processing apparatus according to claim 8, further comprising: a decryption key reading unit configured to read said decryption key from an information storage media in which a decryption key of said storage content is stored; said decryption unit being configured to decrypt said storage content with a decryption key read from an information storage media.

11. The information processing apparatus according to claim 8, wherein the information processing apparatus is configured to be capable of connecting with a decryption key generating apparatus for generating a decryption key of said storage content on the basis of data included in a broadcast signal in which said storage content is included, and said decryption unit obtains a decryption key generated by said decryption key generating apparatus, thereby decrypting said storage content with the obtained decryption key.

12. The information processing apparatus according to claim 1, wherein the display control unit is further configured to display an electronic program guide, wherein the electronic program guide shows storage content that can be scheduled for storage, wherein the information processing apparatus is further configured to allow the user to specify storage content shown in the electronic program guide to be scheduled for storage at a future date and time.

13. The information processing apparatus according to claim 1, wherein storage content is an application program stored in the storage block, wherein execution of the storage content generates an image related with the storage content, wherein said image related with the storage content is displayed as an image that occupies a part of the display unit along with the broadcast content displayed on the display unit.

14. An information processing system comprising:
a broadcasting station;
a reception apparatus; and
a management apparatus;
said broadcasting station including:
a transmission unit configured to transmit a broadcast signal which contains broadcast content for display and storage content for storage; and
said reception apparatus including:
a reception unit configured to receive a broadcast signal of a selected channel that is at least a part of a broadcast signal transmitted from said broadcasting station,
a display control unit configured to control such that broadcast content included in a broadcast signal received by said reception unit is displayed on a display unit, and
a storage content output unit configured to generate log information including an identifier of storage content, that is different from said broadcast content and is included in a broadcast signal received by said reception unit,
wherein the storage content output unit is further configured to output said storage content to a storage unit;
wherein the display control unit is further configured to display a list including the storage content output to the storage unit;
an operation acceptance unit configured to receive a selection of the storage content from the list;
a storage content management unit configured to obtain a decryption key related to the identifier of the selected storage content;
wherein the information processing apparatus is configured to execute payment processing related to the selected storage content; and
said management apparatus is configured to compute profit sharing from said payment on the basis of said log information.

15. An information processing method, comprising the steps of:
receiving a broadcast signal of a selected channel;
controlling such that broadcast content included in a broadcast content received by a reception unit is displayed on a display unit;
generating log information including an identifier of storage content that is different from said broadcast content and is included in a broadcast signal received by said reception unit,
outputting said storage content to a storage unit;
displaying a list including the storage content output to the storage unit;
receiving a selection of the storage content from the list;
obtaining a decryption key according to the identifier of the selected storage content; and
executing payment processing related to the selected storage content;
computing profit sharing from said payment on the basis of said log information.

16. A non-transitory, computer-readable information storage media storing a program, which operates to cause a computer to function as:
a reception unit configured to receive a broadcast signal of a selected channel;
a display control unit configured to control such that broadcast content included in a broadcast content received by said reception unit is displayed on a display unit; and a storage content output unit configured to generate log information including an identifier of storage content to be stored that is different from said broadcast content and is included in a broadcast signal received by said reception unit,
wherein the storage content output unit is further configured to output said storage content to a storage unit,
displaying a list including the storage content output to the storage unit;
receiving a selection of the storage content from the list;
obtaining a decryption key related to the identifier of the selected storage content; and
executing payment processing related to the selected storage content;
computing profit sharing from said payment on the basis of said log information.

* * * * *